United States Patent Office 3,149,142
Patented Sept. 15, 1964

3,149,142
FLUOROVINYL PHOSPHATES AND THE
PREPARATION THEREOF
John J. Drysdale and Howard E. Simmons, Jr., Wilmington, Del., assignors to E. I. du Pont de Nemours and Company, Wilmington, Del., a corporation of Delaware
No Drawing. Filed Nov. 26, 1956, Ser. No. 624,192
9 Claims. (Cl. 260—461)

This invention relates to, and has as its principal objects provision of, novel fluorovinyl phosphates and a synthesis of the same.

This invention is concerned with new organic compositions containing fluorine and with processes for preparing these compositions. More particularly, it is concerned with new organic compositions containing phosphorus and fluorine.

Organic phosphorus compounds containing chlorine and bromine are known and have achieved considerable technical importance as plasticizers, flame-proofing agents, lubricant additives and insecticides. Organic phosphorus compounds containing a dichlorovinyl group are known and have been prepared generally by reaction of chlorine-containing aldehydes with alkyl phosphites. Organic phosphorus compounds containing a dibromovinyl group have also been studied although less extensively than the compounds containing a dichlorovinyl group. However, no information has been found relating to organic phosphorus compounds containing a difluorovinyl group in the molecule. This is not surprising in view of the well-known difficulty of preparing fluorine-containing organic compounds and the frequent unpredictable changes which fluorine compounds undergo under reaction conditions.

An object of this invention is, consequently, provision of novel and useful organic compounds containing both phosphorus and fluorine in the molecule.

A more specific object is provision of novel and useful organic phosphorus compounds containing a difluorovinyl group in the molecule.

The present novel compounds are characterized by the presence of a hydrogen-free difluorovinyl group in which both fluorine atoms are bonded to the same carbon atom. The remaining carbon atom in the difluorovinyl group, in addition to carrying the double bond of the vinyl group, is singly bonded, on one hand, through an intermediate oxygen atom, to pentavalent phosphorus and, on the other hand, to a carbon atom which in turn is bonded to two fluorine atoms and to a halogen, a cyano group, an omega-hydroperfluoroalkyl group or a perfluoroalkyl group.

The compounds of this invention are further characterized by the general structure:

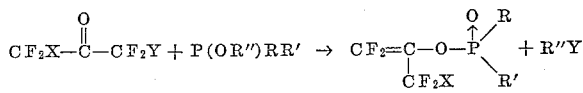

where X is a halogen, a cyano group, an omega-hydroperfluoroalkyl group or a perfluoroalkyl group. Preferably the perfluoroalkyl and omega-hydroperfluoroalkyl groups contain no more than 6 carbon atoms. R and R' are halogens of atomic number 9 through 35, hydrocarbon groups or hydrocarbonoxy groups. As hydrocarbon groups R and R' can be alkyl (hexyl), cycloalkyl (cyclohexyl), aryl (phenyl) or aralkyl (phenylethyl). As hydrocarbonoxy groups R and R' can be alkoxy (butoxy), cycloalkoxy (cyclohexyloxy), aryloxy (phenoxy) and aralkoxy (phenyl-ethyloxy). The number of carbon atoms in each group of R and R' is from 1 to 12 inclusive.

In the preferred group of compounds of the above structure X is a halogen of atomic number 9 through 35 or a cyano group. R and R' are alkyl or alkoxy groups of 1-6 carbon atoms inclusive. Compounds containing the lower number of carbon atoms are preferred since they are more stable thermally and are readily prepared in pure form.

The compounds are prepared by reacting a fluoroketone of the formula

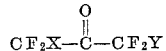

with a phosphorus compound of the formula P (OR'') RR'. X, R and R' are defined in the same manner as given for the formula in the above paragraph, Y is a halogen of atomic number 17 through 53, and R'' is a saturated aliphatic hydrocarbon group of not more than 12 carbon atoms. Preferably R'' is an alkyl group of not more than 6 carbon atoms. The reaction is shown by the following general equation:

$$CF_2X-\overset{O}{\overset{\|}{C}}-CF_2Y + P(OR'')RR' \rightarrow CF_2=\overset{\underset{CF_2X}{|}}{C}-O-\overset{\overset{O}{\uparrow}}{\underset{R'}{P}}\overset{R}{\diagdown} + R''Y$$

The reaction is generally conducted by adding the phosphorus compounds slowly to the fluorinated ketone with vigorous stirring. When the reactants are of low molecular weight, that is, have short alkyl chains, the reaction is generally exothermic and external cooling of the reaction vessel is desirable. For high molecular weight compounds, for example, compounds with long alkyl chains, the application of heat is advantageous to bring the reaction to completion. The reactants are usually dissolved in an inert solvent to permit better control of the reaction. The reaction time is not critical but should be of sufficient length to permit the reaction to be completed. It generally lies between 4 hours and 24 hours. The reactants can be used in equimolar ratios but we prefer to use the fluorine-containing ketone in 10 to 20% molar excess over the phosphorus compound.

Typical compounds of this invention and their preparation are shown by the following examples. These examples are intended to be illustrative only and not limiting. In them parts are by weight and pressures are given in terms of mm. of mercury.

*Example 1*

A reaction vessel equipped with a mechanical stirrer was charged with 50 parts of 1,3-dichloro-1,1,3,3-tetrafluoroacetone placed in an ice-water bath. Forty-two parts of triethyl phosphite was added dropwise thereto with vigorous stirring. The reaction mixture was allowed to stand overnight at room temperature. The liquid product was then distilled to yield 61 parts of 1,1,3,3-tetrafluoro-3-chloroisopropenyl diethyl phosphate. It has the structure:

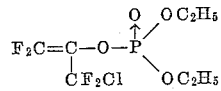

The identity of the compound was confirmed by infrared and elementary analyses. It boiled at 69–71° C./4 mm.; $n_D^{25}=1.3880$.

*Analysis.*—Calc'd. for $C_7H_{10}F_4ClO_4P$: C, 27.90%; H, 3.35%; F, 25.28%; Cl, 11.79%. Found: C, 29.06%; H, 4.00%; F, 24.46%; Cl, 12.35%.

*Example 2*

A reaction vessel equipped with a reflux condenser and magnetic stirrer was charged with 25.0 parts of 1,1,3,3-tetrafluoro-3-chloroisopropenyl diethyl phosphate, 6.1 parts of potassium cyanide and 40 parts of acetonitrile. On stirring a mildly exothermic reaction occurred. The mixture was stirred for 18 hours following which it was filtered. The filtrate was evaporated to remove acetonitrile and the dark liquid residue was fractionally distilled under reduced pressure to yield 7.4 parts of 1,1,3,3-tetrafluoro-3-cyanoisopropenyl diethyl phosphate, boiling at 54–55° C. at 9 mm. pressure. The refractive index of the compound, $n_D^{24}$, was 1.3698. It has the structure:

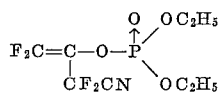

Its structure was confirmed by infrared and nuclear magnetic resonance spectra. The compound hydrolyzed very readily in water.

Although the compound of Example 2 was prepared by a process utilizing as a reactant the compound obtained in Example 1, it can be prepared equally readily from 1-chloro-3-cyano-1,1,3,3-tetrafluoroacetone and triethyl phosphite by the process of Example 1. Other inorganic cyanides such as NaCN can be substituted for KCN in the process of Example 2.

The fluorinated ketones used as reactants in preparing the compounds of this invention are disclosed in U.S. Patent 2,741,634. They are hydrogen free and have the ketone oxygen attached to the carbon in the 2-position. The carbon atom in the 1-position, that is, the terminal carbon attached to the carbon of the ketone group, contains two, and only two, fluorine atoms and in addition one other halogen, preferably chlorine. It is this halogen which reacts during the process of preparation and is removed as the alkyl halide, leaving a difluorovinyl group. It is essential also that the phosphite used in the process contain at least one saturated aliphatic hydrocarbonoxy group, preferably alkoxy, since it is the hydrocarbon portion of this hydrocarbonoxy group which reacts with the chlorine or bromine of the ketone compound.

Examples of ketones which can be used in the process are 1-chloro-1,1,3,3,3-pentafluoroacetone, 1-bromo-1,1,3,3,3-pentafluoroacetone, 1-chloro-3-cyano-1,1,3,3-tetrafluoroacetone, 1,3-dibromo-1,1,3,3-tetrafluoroacetone, chlorodifluoromethyl perfluoroethyl ketone, chlorodifluoromethyl perfluoropropyl ketone, bromodifluoromethyl perfluorobutyl ketone, chlorodifluoromethyl perfluorohexyl ketone, chlorodifluoromethyl omega-hydroperfluorobutyl ketone and bromodifluoromethyl omega-hydroperfluorohexyl ketone. Examples of phosphite esters which can be used in the reaction are trimethyl phosphite, tributyl phosphite, dimethyl phosphorochloridite, ethyl phosphorodibromidite, methyl dimethylphosphinite, diethyl butylphosphonite, dimethyl octylphosphonite, diethyl dodecylphosphonite, diethyl phenylphosphonite and ethyl dicyclohexylphosphinite.

Compounds which can be prepared by the procedure given in Example 1 are as follows: 3-bromo-1,1,3,3-tetrafluoroisopropenyl dibutyl phosphate from 1,3-dibromo-1,1,3,3-tetrafluoroacetone and tributyl phosphite; perfluoroisopropenyl didodecyl phosphate from 1-chloro-1,1,3,3,3-pentafluoroacetone and tridodecyl phosphite; perfluoroisopropenyl diphenylphosphinate from 1-chloro-1,1,3,3,3-pentafluoroacetone and ethyl diphenylphosphinite; 1-(perfluoroethyl)difluorovinyl diethyl phosphate from chlorodifluoromethyl perfluoroethyl ketone and triethyl phosphite; 1-(perfluorobutyl)difluorovinyl diphenylphosphinate from chlorodifluoromethyl perfluorobutyl ketone and ethyl diphenylphosphinite; 1-(1,1,2,2-tetrafluoroethyl)difluorovinyl phosphorodibromidate from bromodifluoromethyl 1,1,2,2-tetrafluroethyl ketone and methyl phosphorodibromidite; and 1-(omegahydroperfluorohexyl)difluorovinyl phosphorodichloridate from chlorodifluoromethyl omega-hydroperfluorohexyl ketone and ethyl phosphorodichloridite.

The conditions under which the reaction is performed are determined by the reactivity of both components. Reactions using alkyl phosphites can be satisfactorily conducted in the presence of air. Reactions in which an alkyl phosphinite or phosphonite, that is, alkyl esters of $R_2POH$ or of $RP(OH)_2$, is used are preferably performed in an oxygen-free atmosphere, for example, nitrogen. Reactions in which the phosphorus compounds contain short alkyl chains will generally require cooling, whereas reactions using phosphorus compounds with long alkyl chains will usually require heating to carry them to completion. The temperature of the reaction will be determined to some extent by the boiling point of the alkyl halide which is obtained as a by-product.

The difluorovinyl phosphorus compounds of this invention are generally liquids or low-melting solids which are thermally stable and can be distilled under reduced pressure without decomposition. Many of them are toxic and must be handled with precautions against inhalation and prolonged contact with the skin. The compound of Example 2, for instance, on only brief exposure to its vapors, causes pronounced difficulty in breathing, presumably through action on the nervous system. The compounds are generally insoluble in water but will hydrolyze slowly if kept in contact with water. They are soluble in the readily available organic solvents such as ether, benzene, cyclohexane, nitrobenzene, dioxane, acetone and dimethylformamide.

The compounds of this invention are useful in eliminating noxious pests and destroying vermin. Thus the compound of Example 1, 1,1,3,3-tetrafluoro-3-chloroisopropenyl diethyl phosphate, when tested in 1% solution in acetone, rendered moribund the following percentages of insects: 80% house flies, 100% German roaches, 100% bean aphids and 100% two-spotted mites. The action on the respiratory system of the compound of Example 2, 1,1,3,3-tetrafluoro-3-cyanoisopropenyl diethyl phosphate, makes it effective in destroying vermin.

Since obvious modifications in the invention will occur to those skilled in the chemical art, we propose to be bound solely by the appended claims.

The embodiments of the invention in which an exclusive property or privilege is claimed are defined as follows:

1. A compound of the formula

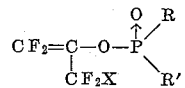

wherein:

X is selected from the group consisting of halogen of atomic number 9–35, cyano, perfluoroalkyl of not more than 6 carbons and omega-hydroperfluoroalkyl of not more than 6 carbons; and R and R' are selected from the group consisting of halogen of atomic number 9–35 and alkyl, cycloalkyl, aryl, aralkyl, alkoxy, cycloalkoxy, aryloxy and aralkoxy of not more than 12 carbons.

2. 1,1,3,3-tetrafluoro-3-chloroisopropenyl diethyl phosphate.

3. 1,1,3,3-tetrafluoro-3-cyanoisopropenyl diethyl phosphate.

4. The method of preparing the compound of claim 1 which comprises reacting a fluoroketone of the formula

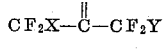

with a phosphite of the formula P(OR")RR' where X, R and R' are defined as in claim 1, Y is a halogen of atomic number 17 through 53 and R" is a saturated aliphatic hydrocarbon group of not more than 12 carbon atoms.

5. The method of preparing 1,1,3,3-tetrafluoro-3-chloroisopropenyl diethyl phosphate which comprises reacting 1,3-dichloro-1,1,3,3-tetrafluoroacetone with triethyl phosphite.

6. The method of preparing 1,1,3,3-tetrafluoro-3-cyanoisopropenyl diethyl phosphate which comprises reacting 1,1,3,3-tetrafluoro-3-chloroisopropenyl diethyl phosphate with an alkali metal cyanide.

7. The method of preparing 1,1,3,3-tetrafluoro-3-cyanoisopropenyl diethyl phosphate which comprises reacting 1-chloro-3-cyano-1,1,3,3-tetrafluoroacetone with triethyl phosphite.

8. A halo-substituted vinyl phosphate having the following general formula:

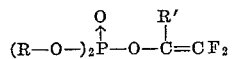

in which R is alkyl containing from 1 to 4 carbon atoms and R' is a member of the group consisting of chlorodifluoromethyl and trifluoromethyl.

9. The method of preparing a halo-substituted vinyl phosphate having the following general formula:

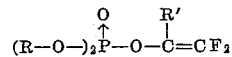

in which R is alkyl containing from 1 to 4 carbon atoms and R' is a member of the group consisting of chlorodifluoromethyl and trifluoromethyl which comprises reacting a fluoroketone having the following general formula:

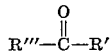

in which each R' and R''' is a member of the group consisting of chlorodifluoromethyl and trifluoromethyl, and R' and R''' taken together contain at least one chlorine atom, with a phosphite having the following general formula:

in which R is alkyl containing from 1 to 4 carbon atoms.

References Cited in the file of this patent

UNITED STATES PATENTS

| | | |
|---|---|---|
| 2,394,829 | Whitehill et al. | Feb. 12, 1946 |
| 2,656,373 | Gamrath | Oct. 20, 1953 |
| 2,724,719 | Markley et al. | Nov. 22, 1955 |
| 2,727,058 | Conly | Dec. 13, 1955 |

FOREIGN PATENTS

| | | |
|---|---|---|
| 1,066,923 | France | Jan. 27, 1954 |
| 941,972 | Germany | Apr. 26, 1956 |
| 310,399 | Switzerland | Dec. 16, 1955 |

OTHER REFERENCES

Pudovic: Doklady Akad. NAVK SSSR, 1955, vol. 1056, pages 735–7.

Richter: Textbook of Organic Chemistry, 1952, page 131.

Allen et al.: "J. Am. Chem. Soc.," 77, 2871 (May 20, 1955).